United States Patent
Brelin

(10) Patent No.: US 7,130,315 B1
(45) Date of Patent: Oct. 31, 2006

(54) METHOD OF AND APPARATUS FOR UTILIZING EXTENDED AV/C COMMAND AND RESPONSE FRAMES INCLUDING TRANSACTION LABEL AND COMMON RESULT/ERROR CODE

(75) Inventor: Jon Ebbe Brelin, Campbell, CA (US)

(73) Assignees: Sony Corporation, Tokyo (JP); Sony Electronics Inc., San Deigo, CA (US)

( * ) Notice: Subject to any disclaimer, the term of this patent is extended or adjusted under 35 U.S.C. 154(b) by 1200 days.

(21) Appl. No.: 09/624,707

(22) Filed: Jul. 25, 2000

Related U.S. Application Data

(60) Provisional application No. 60/153,356, filed on Sep. 10, 1999.

(51) Int. Cl.
*H04J 3/00* (2006.01)
*H04J 3/12* (2006.01)

(52) U.S. Cl. ...................... 370/476; 370/522
(58) Field of Classification Search .............. 370/259, 370/392, 476, 522
See application file for complete search history.

(56) References Cited

U.S. PATENT DOCUMENTS

| | | | | |
|---|---|---|---|---|
| 4,780,821 A | 10/1988 | Crossley | ................ | 718/100 |
| 4,922,486 A | 5/1990 | Lidinsky et al. | ................ | 370/60 |
| 5,020,054 A | 5/1991 | May, Jr. | ................ | 370/94 |
| 5,077,732 A | 12/1991 | Fischer et al. | ................ | 370/437 |
| 5,117,070 A | 5/1992 | Ueno et al. | ................ | 178/2 R |
| 5,367,679 A | 11/1994 | Khaira | ................ | 718/103 |
| 5,394,522 A | 2/1995 | Sanchez-Frank et al. | ... | 345/735 |
| 5,422,883 A | 6/1995 | Hauris et al. | ................ | 370/261 |
| 5,436,898 A | 7/1995 | Bowen et al. | ................ | 370/79 |
| 5,446,733 A | 8/1995 | Tsuruoka | ................ | 370/232 |
| 5,471,474 A | 11/1995 | Grobicki et al. | ............ | 370/437 |
| 5,479,385 A | 12/1995 | Hoekstra | ................ | 369/24 |
| 5,495,481 A | 2/1996 | Duckwall | ................ | 370/85.2 |
| 5,499,018 A | 3/1996 | Welmer | ................ | 340/3.51 |
| 5,500,934 A | 3/1996 | Austin et al. | ................ | 345/853 |

(Continued)

FOREIGN PATENT DOCUMENTS

EP 0 577 054 A1 6/1993

(Continued)

OTHER PUBLICATIONS

Michael Teener et al., "A Bus on a Diet—The Serial Bus Alternative, An Introduction to the P1394 High performance Serial Bus" Apple Computer, Inc. Santa Clara, CA, Pub. Date.: Feb. 24, 1992, pp. 316-321.

(Continued)

*Primary Examiner*—Kevin C. Harper
(74) *Attorney, Agent, or Firm*—Haverstock & Owens LLP

(57) ABSTRACT

AV/C command and response data packets are used for asynchronous data block transactions between devices over an IEEE 1394-1995 serial bus network. Extension data fields hold extension data that support new or added features of an IEEE 1394-1995 serial bus network and devices operating therein. The AV/C data packets are encoded for the extension data fields by providing extended fields data within data fields of the Function Control Protocol (FCP) data frames. The extended fields data specifies whether or not the packet includes extension data fields, and if so, how many bytes of extension data may be included within the data field. Extension data supports device and system features such as transaction labels and error/result messages. Transaction data is used to determine the number of other extension data fields to be used during AV/C data transacted between devices and provides for the ability to establish communication protocols based on mutually supported features.

14 Claims, 9 Drawing Sheets

U.S. PATENT DOCUMENTS

| | | | |
|---|---|---|---|
| 5,524,213 A | 6/1996 | Dais et al. | 395/200.17 |
| 5,528,513 A | 6/1996 | Vaitzbit et al. | 364/514 A |
| 5,548,722 A | 8/1996 | Jalalian et al. | 709/220 |
| 5,555,413 A | 9/1996 | Lohman et al. | 710/260 |
| 5,557,724 A | 9/1996 | Sampat et al. | 725/43 |
| 5,574,867 A | 11/1996 | Khaira | 710/113 |
| 5,579,496 A | 11/1996 | Van Steenbrugge | 395/567 |
| 5,632,016 A | 5/1997 | Hoch et al. | 395/200.02 |
| 5,650,775 A | 7/1997 | Van Steenbrugge | 340/825.4 |
| 5,659,373 A | 8/1997 | Hoekstra | 348/734 |
| 5,682,489 A | 10/1997 | Harrow et al. | 345/839 |
| 5,694,555 A | 12/1997 | Morriss et al. | 395/280 |
| 5,719,942 A | 2/1998 | Aldred et al. | 709/228 |
| 5,724,646 A | 3/1998 | Ganek et al. | 725/89 |
| 5,781,703 A | 7/1998 | Desai et al. | 706/50 |
| 5,793,366 A | 8/1998 | Mano et al. | 345/839 |
| 5,815,678 A | 9/1998 | Hoffman et al. | 710/305 |
| 5,933,430 A | 8/1999 | Osakabe et al. | 370/463 |
| 5,991,520 A | 11/1999 | Smyers et al. | 710/100 |
| 6,055,641 A | 4/2000 | Konaka et al. | 713/320 |
| 6,088,364 A * | 7/2000 | Tokuhiro | 370/466 |
| 6,094,681 A | 7/2000 | Shaffer et al. | 709/224 |
| 6,141,702 A | 10/2000 | Ludtke et al. | 710/5 |
| 6,150,953 A | 11/2000 | Tanaka et al. | 340/825.37 |
| 6,160,796 A | 12/2000 | Zou | 370/257 |
| 6,169,725 B1 | 1/2001 | Gibbs et al. | 370/216 |
| 6,233,611 B1 | 5/2001 | Ludtke et al. | 709/223 |
| 6,237,049 B1 * | 5/2001 | Ludtke | 710/8 |
| 6,279,061 B1 * | 8/2001 | Aoki et al. | 710/65 |
| 6,288,716 B1 | 9/2001 | Humpleman et al. | 345/733 |
| 6,292,624 B1 | 9/2001 | Saib et al. | 386/83 |
| 6,359,557 B1 | 3/2002 | Bilder | 340/531 |
| 6,363,434 B1 | 3/2002 | Eytchison | 709/313 |
| 6,370,688 B1 | 4/2002 | Hejna, Jr. | 725/101 |
| 6,401,119 B1 | 6/2002 | Fuss et al. | 709/224 |
| 6,438,110 B1 | 8/2002 | Rai et al. | 370/254 |
| 6,466,971 B1 | 10/2002 | Humpleman et al. | 709/220 |
| 6,513,064 B1 | 1/2003 | Horiguchi et al. | 709/223 |
| 6,516,416 B1 | 2/2003 | Gregg et al. | 713/201 |
| 6,522,654 B1 * | 2/2003 | Small | 370/400 |
| 6,564,295 B1 | 5/2003 | Okabayashi et al. | 711/114 |
| 6,584,502 B1 | 6/2003 | Natarajan et al. | 709/224 |
| 6,654,821 B1 | 11/2003 | Aikawa et al. | 710/36 |
| 6,775,714 B1 * | 8/2004 | Miyano | 710/8 |
| 2001/0021194 A1 | 9/2001 | Horiguchi et al. | 370/421 |
| 2002/0026540 A1 * | 2/2002 | Smyers | 710/8 |
| 2002/0196374 A1 * | 12/2002 | Barry et al. | 348/725 |

FOREIGN PATENT DOCUMENTS

| | | |
|---|---|---|
| EP | 0 631 247 A2 | 6/1994 |
| EP | 0 789 502 A2 | 8/1997 |
| JP | 4 0 932 681 2 A | 12/1997 |
| WO | 0 812 092 A2 | 10/1997 |

OTHER PUBLICATIONS

P1394 Standard For A High Performance Serial Bus, IEEE, 1995.

"The IEEE-1394 High Speed Serial Bus," R.H.J. Bloks, Philips Journal Of Research, vol. 50, No. 1/2, pp. 209-216, 1996.

"*Real-Time DV Transmission on Hybrid Network with IEEE 1394 and ATM*", Miyashita et al., AVC Products Development Laboratory, Matsushita Electric Industrial Co., Ltd. 1006, Kadoma, Kadoma-shi, Osaka Japan. pp. 148-149.

"*Home Network File System for Home Network Based on IEEE-1394 Technology*," Tatsuya Igrashi et al., IT Laboratories, Sony Corporation, Tokyo, Japan, Aug. 1999, pp. 1000-1003.

"*AV/C Digital Interface Command Set General Specification*", from 1394 Trade Association, Version 3.0, Apr. 15, 1998, Copyright 1996-1997, 91 pages.

* cited by examiner

*Fig. 1*  <u>PRIOR ART</u>

| Field Value | Status/Error Type |
|---|---|
| $0000_{16}$ | No Status/Error (accepted) |
| $0001_{16}$ - $0FFF_{16}$ | Accepted Statuses |
| $1000_{16}$ - $1FFF_{16}$ | Reserved |
| $2000_{16}$ - $2FFF_{16}$ | Unsupported Command |
| $3000_{16}$ - $3FFF_{16}$ | Reserved |
| $4000_{16}$ - $4FFF_{16}$ | Invalid field errors |
| $5000_{16}$ - $5FFF_{16}$ | Reserved |
| $6000_{16}$ - $6FFF_{16}$ | Unsupported field error |
| $7000_{16}$ - $7FFF_{16}$ | Reserved |
| $8000_{16}$ - $8FFF_{16}$ | Target State Error |
| $9000_{16}$ | Invalid subunit |
| $9001_{16}$ | Unknown Error |
| $9002_{16}$ - $FFFF_{16}$ | Reserved |

METHOD OF AND APPARATUS FOR UTILIZING EXTENDED AV/C COMMAND AND RESPONSE FRAMES INCLUDING TRANSACTION LABEL AND COMMON RESULT/ERROR CODE

RELATED APPLICATIONS

This application claims priority under 35 U.S.C. § 119(e) of the co-pending U.S. Provisional Patent Application Ser. No. 60/153,356 filed Sep. 10, 1999 and entitled "AV/C-2 Protocol extensions to the AV/C Command and Response Frames." The Provisional Patent Application Ser. No. 60/153,356 filed Sep. 10, 1999 and entitled "AV/C-2 Protocol extensions to the AV/C Command and Response Frames" is also hereby incorporated by reference.

FIELD OF THE INVENTION

The present invention relates to methods for encoding data and data streams transacted over a serial bus network. More specifically, the present invention relates to a method of and apparatus for encoding AV/C command and response frames for asynchronous data transmissions over an IEEE 1394-1995 Standard serial bus network.

BACKGROUND OF THE INVENTION

The IEEE standard, "IEEE Std 1394-1995 Standard For A High Performance Serial Bus," is an international standard for implementing an inexpensive high-speed serial bus architecture which supports both asynchronous and isochronous format data transfers. Isochronous data transfers are real-time transfers which take place such that the time intervals between significant instances have the same duration at both the transmitting and receiving applications. Each packet of data transferred isochronously is transferred in its own time period. An example of an ideal application for the transfer of data isochronously would be from a video recorder to a television set. The video recorder records images and sounds and saves the data in discrete chunks or packets. The video recorder then transfers each packet, representing the image and sound recorded over a limited time period, during that time period, for display by the television set. The IEEE 1394-1995 serial bus architecture provides multiple channels for isochronous data transfer between applications. A six bit channel number is broadcast with the data to ensure reception by the appropriate application. This allows multiple applications to simultaneously transmit isochronous data across the bus structure. Asynchronous transfers are traditional data transfer operations which take place as soon as possible and transfer an amount of data from a source to a destination.

The IEEE 1394-1995 standard provides a high-speed serial bus for interconnecting digital devices thereby providing a universal I/O connection. The IEEE 1394-1995 standard defines a digital interface for the applications thereby eliminating the need for an application to convert digital data to analog data before it is transmitted across the bus. Correspondingly, a receiving application will receive digital data from the bus, not analog data, and will therefore not be required to convert analog data to digital data. The cable required by the IEEE 1394-1995 standard is very thin in size compared to other bulkier cables used to connect such devices. Devices can be added and removed from an IEEE 1394-1995 bus while the bus is active. If a device is so added or removed the bus will then automatically reconfigure itself for transmitting data between the then existing nodes. A node is considered a logical entity with a unique address on the bus structure. Each node provides an identification ROM, a standardized set of control registers and its own address space. Because of these advantages the IEEE 1394-1995 standard provides for a unique networking structure that is capable of incorporating audio/video devices, media play/record devices, computing devices and display devices.

A diverse range of products can be implemented with the ability to connect to an IEEE 1394-1995 serial bus network. These devices can have capabilities and functionality ranging from very simple to very complex. Specifically, a variety of audio/video devices, media play/record devices and computing/display devices are capable of being linked together over an IEEE 1394-1995 serial bus networking structure to support asynchronous and isochronous data transfers between the devices.

The IEEE 1394-1995 serial bus allows a collection of devices to work together in a high bandwidth, distributed environment to maximize the overall efficiency and functionality of the network. This allows manufacturers to remove expensive pieces of functionality from one device and locate that functionality in another device on the network, instead of duplicating this functionality in all devices on the network. While some of the devices have limited functionality and are relatively inexpensive, such devices require the support and interaction of other devices in order to bring the full functionality of the devices within the network to the user.

The AV/C Digital Interface Command Set is a command set used for data transactions between consumer audio/video equipment over an IEEE 1394-1995 serial bus. Neither the IEEE 1394-1995 serial bus nor the AV/C command set provide a master-slave relationship between the devices coupled within the IEEE 1394-1995 serial bus network. Instead, both the IEEE 1394-1995 serial bus and the AV/C command set operate based on a cooperative peer-to-peer coexistence of devices within the network. Discrete AV/C command and response data packets are transferred between networked devices over an IEEE 1394-1995 serial bus in an asynchronous data stream. The AV/C command and response data packets are typically formatted according to the AV/C protocol outlined in the AV/C Digital Interface Command Set. Transfers of AV/C command and response data packets over the IEEE 1394-1995 serial bus network are supported by an AV/C architecture. The AV/C architecture is used by devices to create, process and/or transmit AV/C command and response data packets.

The target device is controllable by a controller device that initiates desired data transactions. The desired data transactions are 1394 write transactions, wherein a controller device requests a target device to perform a task. The data transactions are contained within command and response frames of the command and request data packets which are formatted according to the Function Control Protocol (FCP) and then transferred asynchronously between device nodes on the IEEE 1394 serial bus.

New features are continually being added to devices that operate within the IEEE 1394-1995 serial bus network environment. These new features are not necessarily supported by the existing AV/C command and response frame data format. Compatibility of the newly designed devices and existing or legacy devices is also an issue which must be addressed by designers of devices adding new features.

SUMMARY OF THE INVENTION

The current invention provides a method to encode AV/C command and response data packets to include extended header data fields. Original AV/C header fields contain information that is common to all AV/C commands. The extended header data fields hold extension data to support new features that are common to the system and devices operating therein. The AV/C command and response data packets of the present invention are particularly useful for facilitating transactions of AV/C command and response data between devices while maintaining a constant data payload of 512 bytes per data packet as required to maintain compatibility with existing IEEE 1394-1995 devices.

The invention provides for an adaptive method of transmitting AV/C command and response data packets between devices on a serial bus, wherein extended header fields provide a signature for a preferred AV/C data format to be used between communicating devices. For example, a control device sends an AV/C command data packet containing extended header fields to a receiving target device. The receiving target device then reads the extended header fields and establishes protocol compatibility with the transmitting control device. If the target device is compatible with the AV/C command data format, the target device processes the transaction and subsequent AV/C data transactions between the control device and the target device utilizing the data packets with extended header fields. If the target device is not compatible with the data format, a not implemented response will be sent to the control device and the control device will then send a command data packet without extended header fields. Preferably, control devices keep track of which target device nodes are compatible with AV/C data packets containing extended header fields.

In the preferred embodiment of the invention, extended header fields data is provided to encode AV/C command and response data packets with a number of extension data fields which collectively hold up to 30 bytes of extension data which is indicated using the known opcode field. The extension data is used to support new system or device features. Preferably, the extension data is provided in data fields of the FCP data frames. The extended fields data is encoded using the opcode field such that when the first hexadecimal data value is equal to eight, the second hexadecimal data value is equal to the number of bytes of extension data included within the packet and when the first hexadecimal data value is nine, the opcode field indicates that the number of bytes of extension data included within the packet is equal to fifteen plus the second hexadecimal data value.

In the preferred embodiment of the invention, the AV/C command and response data packets contain extension data fields and extension data appropriate for each transmitting device. Each device operating within the network knows where the extension opcode field is within the data packet construction and any device that receives a data packet containing an unsupported opcode resulting in unsupported extension data fields and/or unsupported extension data, will respond with a not implemented notification. A sending device generates command or response data packets which contain extension data fields and extension data required to support its features without regard to features mutually supported by the receiving device. For example, a control device sends a command data packet with extension data fields and extension data required to support all of its features. When a target device receives the command data packet encoded with one or more extension data fields that are not recognized or supported by the target device, the target device will accept and process the command data packet, but will ignore that extension data fields and the extension data that it does not recognize. To indicate to the controller which extended data fields the target device supports, the target device sends a response frame back to the control device containing only the extended fields that it supports, and the associated opcode field value which encodes those fields. The controller then modifies subsequent packets to include only the extended fields supported by the target device. Alternatively, the control device can continue to issue command data packets with extension data fields and extension data required to support all of the features of the control device.

The existence of extended fields data is alternatively indicated using the cts data field of the FCP data frame and encodes the data packet to hold either one or two bytes of transaction data.

In another embodiment of the current invention, extended header fields encode AV/C command and response data packets for extension data fields that hold transaction data. The transaction data values encode response and command data packets such that devices operating within the network can use the transaction data values to match pairs of individual response and command data packets or to match sets of command and response data packets. For example, a control device may send several command data packets to a single target device. The target device may respond with a corresponding response data packet for each command data packet sent, but the response data packets may be sent or received out of order. By comparing the transaction label data of the response data packet, the control device matches the response data with the appropriate command data. Preferably, transaction data values are correlated to transaction types or labels that are used to provide detailed histories of each data packet transmitted between devices.

If the data packet is encoded to hold one byte of extended transaction data, 256 corresponding transaction labels or types are possible. If the data packet is encoded to hold two bytes of extended transaction data, 65535 corresponding transaction labels or types are possible. By providing transaction data within AV/C command and response data packets, devices that receive multiple or duplicate requests can provide transaction notification to the sending devices when an error has occurred. Further, transaction data provides a general way to determine the transaction histories for each data packet transmitted over an IEEE 1394-1995 serial bus network.

The extended data fields can also include a result/error field. The result/error field returns specific values that indicate the result of a command, such as status or error of the command, after its execution on the target device.

DETAILED DESCRIPTION OF THE INVENTION

Figure 1:
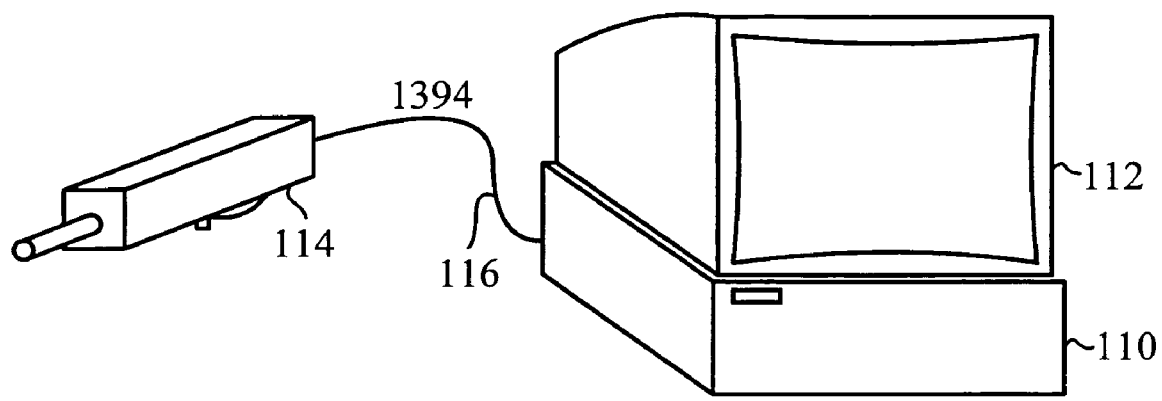
FIG. 1 illustrates a block diagram of an exemplary IEEE 1394-1995 serial bus network including a computer system and a video camera.

A block diagram of an exemplary IEEE 1394-1995 serial bus network including a computer system and a video camera is illustrated in FIG. 1. The computer system 110 includes an associated display 112 and is coupled to the video camera 114 by the IEEE 1394-1995 serial bus cable 116. Video data and associated data are sent between the video camera 114 and the computer 110 over the IEEE 1394-1995 serial bus cable 116.

Figure 2:
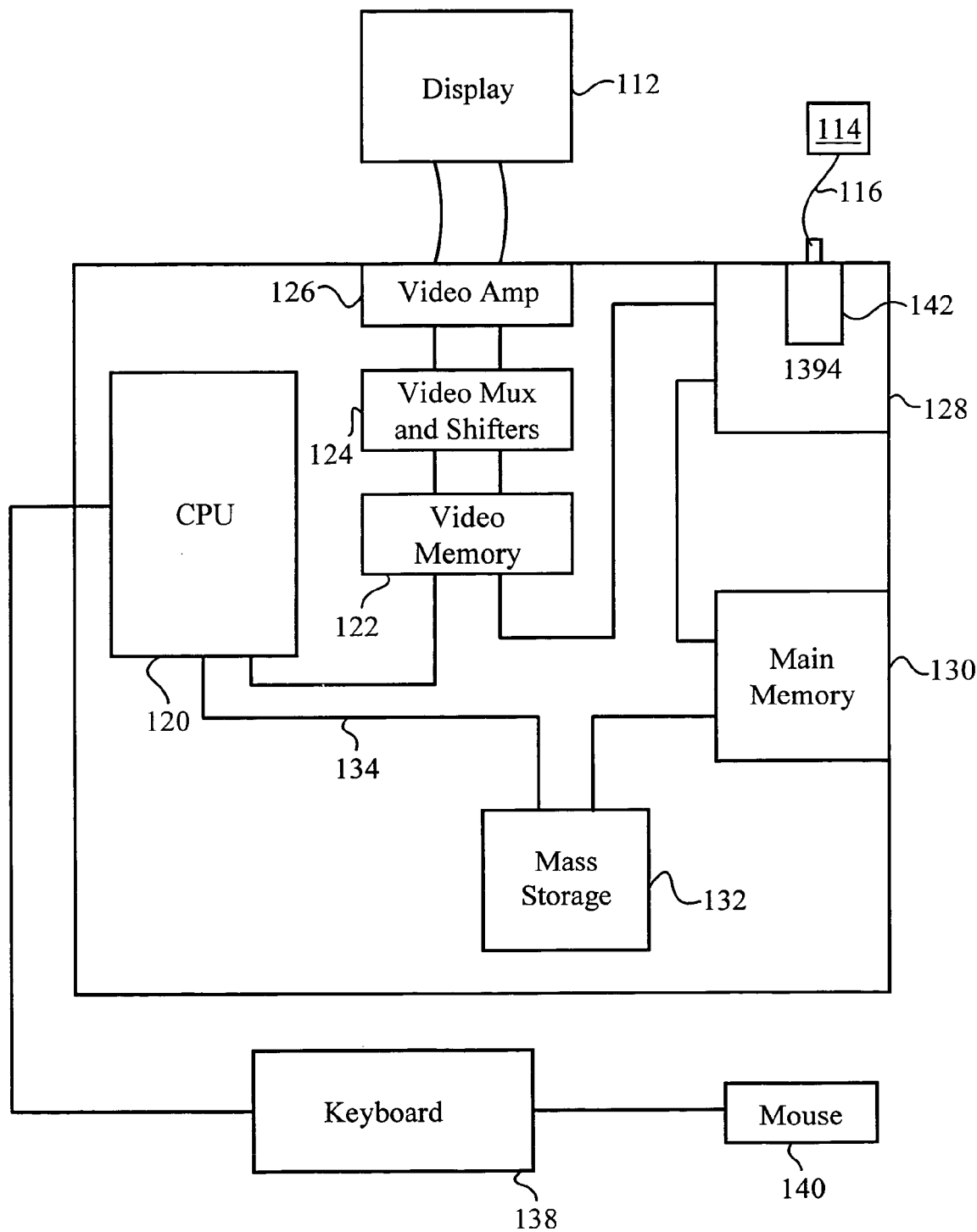
FIG. 2 illustrates a block diagram of the internal components of the computer system 110.

A block diagram of the internal components of the computer system 110 is illustrated in FIG. 2. The computer system 110 includes a central processor unit (CPU) 120, a main memory 130, a video memory 122, a mass storage device 132 and an IEEE 1394-1995 interface circuit 128, all coupled together by a conventional bidirectional system bus 134. The interface circuit 128 includes the physical interface circuit 142 for sending and receiving communications over the IEEE 1394-1995 serial bus. The physical interface circuit 142 is coupled to the camera 114 over the IEEE 1394-1995 serial bus cable 116. In the preferred embodiment of the present invention, the interface circuit 128 is implemented on an IEEE 1394-1995 interface card within the computer system 110. However, it should be apparent to those skilled in the art that the interface circuit 128 can be implemented within the computer system 110 in any other appropriate manner, including building the interface circuit onto the motherboard itself. The mass storage device 132 may include both fixed and removable media using any one or more of magnetic, optical or magneto-optical storage technology or any other available mass storage technology. The system bus 134 contains an address bus for addressing any portion of the memory 122 and 130. The system bus 134 also includes a data bus for transferring data between and among the CPU 120, the main memory 130, the video memory 122, the mass storage device 132 and the interface circuit 128.

The computer system 110 is also coupled to a number of peripheral input and output devices including the keyboard 138, the mouse 140 and the associated display 112. The keyboard 138 is coupled to the CPU 120 for allowing a user to input data and control commands into the computer system 110. A conventional mouse 140 is coupled to the keyboard 138 for manipulating graphic images on the display 112 as a cursor control device.

A port of the video memory 122 is coupled to a video multiplex and shifter circuit 124, which in turn is coupled to a video amplifier 126. The video amplifier 126 drives the display 112. The video multiplex and shifter circuitry 124 and the video amplifier 126 convert pixel data stored in the video memory 122 to raster signals suitable for use by the display 112.

Figure 3:
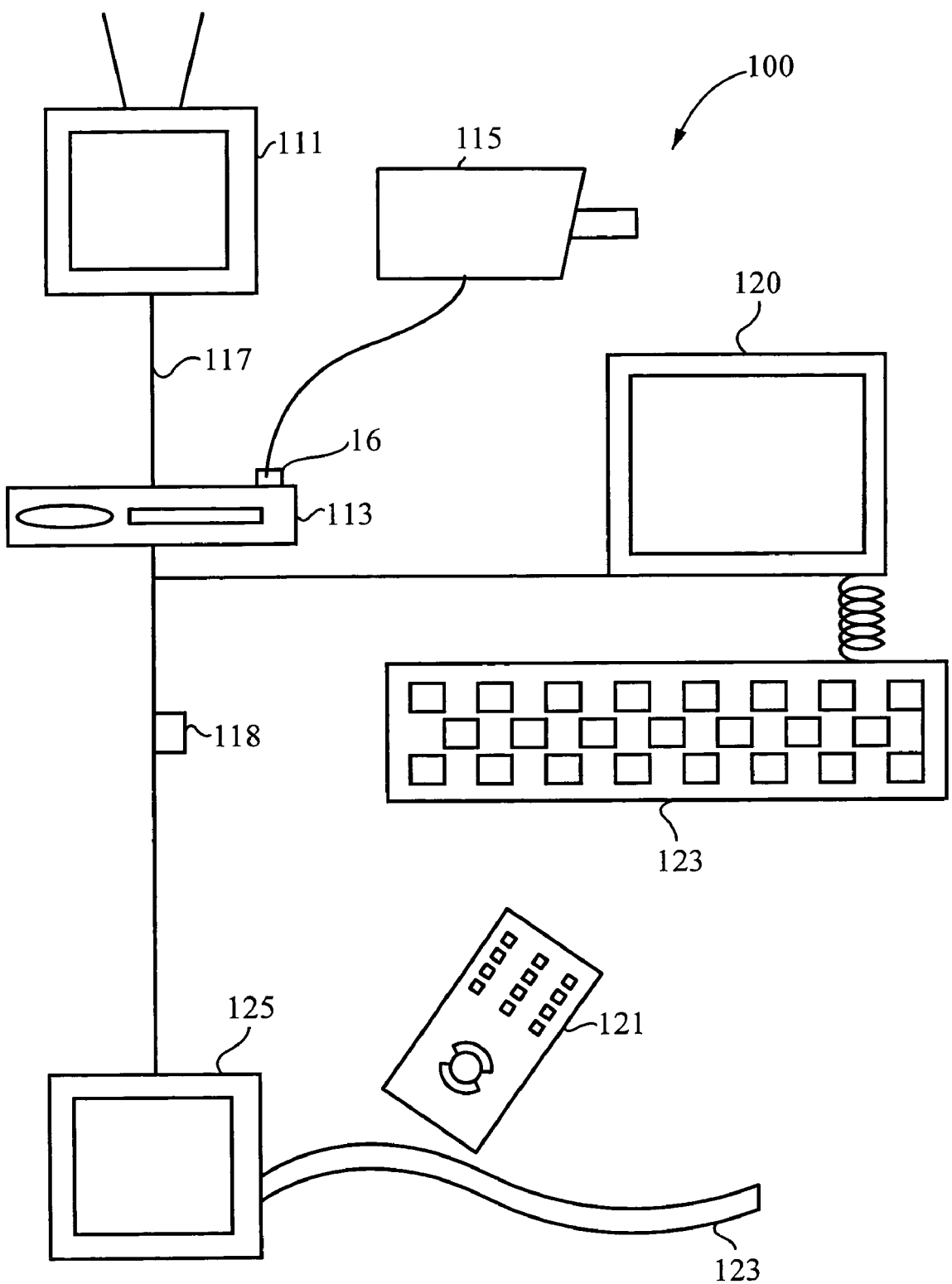
FIG. 3 shows an exemplary networked system configured for transmitting isochronous and asynchronous data between device nodes over an IEEE 1394-1995 serial bus.

FIG. 3 illustrates an exemplary network of devices 100 coupled together by an IEEE 1394-1995 input/output serial bus 117. A television 111, an internet monitoring device 125, and a personal computer 120 are coupled to a VCR unit 113 through the IEEE 1394-1995 serial bus 117. The network of devices 110 further includes a video recorder 115, that is adapted to transmit image and sound data to any of the monitor devices 111, 120 and 125 for displaying the image and sound data. The image and sound data is transmitted from the recorder 115 to the monitor devices 111, 120 and 125 through the serial bus 117. Video and sound data is transmitted isochronously in data packets as previously described.

Again referring to FIG. 3, the television 111 and the VCR unit 113 are controlled by a user through the remote control device 121 or by the computer 120. By selecting various input commands on the entry pad of the controller device 121 or through the computer key pad 123, the televison 111 and VCR unit 113 can be turned on, shut off and programmed. Entering input commands at the user level through the control devices 121 and 120, or at the devices themselves, provides the user with the ability to make requests and to control networked devices. At the systems level command and response data transactions take place between networked devices to carry out the user's requests, maintain device communications, support transmission of image and sound data, to provide for synchronization of data transfers and perform systems diagnostics.

Again referring to FIG. 3, AV/C command and response data transactions that take place between the television 111 and the VCR unit 113 or between the video recorder device 115 and the VCR unit 113 provide the instructional data and allow the VCR unit 113 to communicate with the television 111 and the video recorder 115 and to carry out the user requests.

Figure 4:
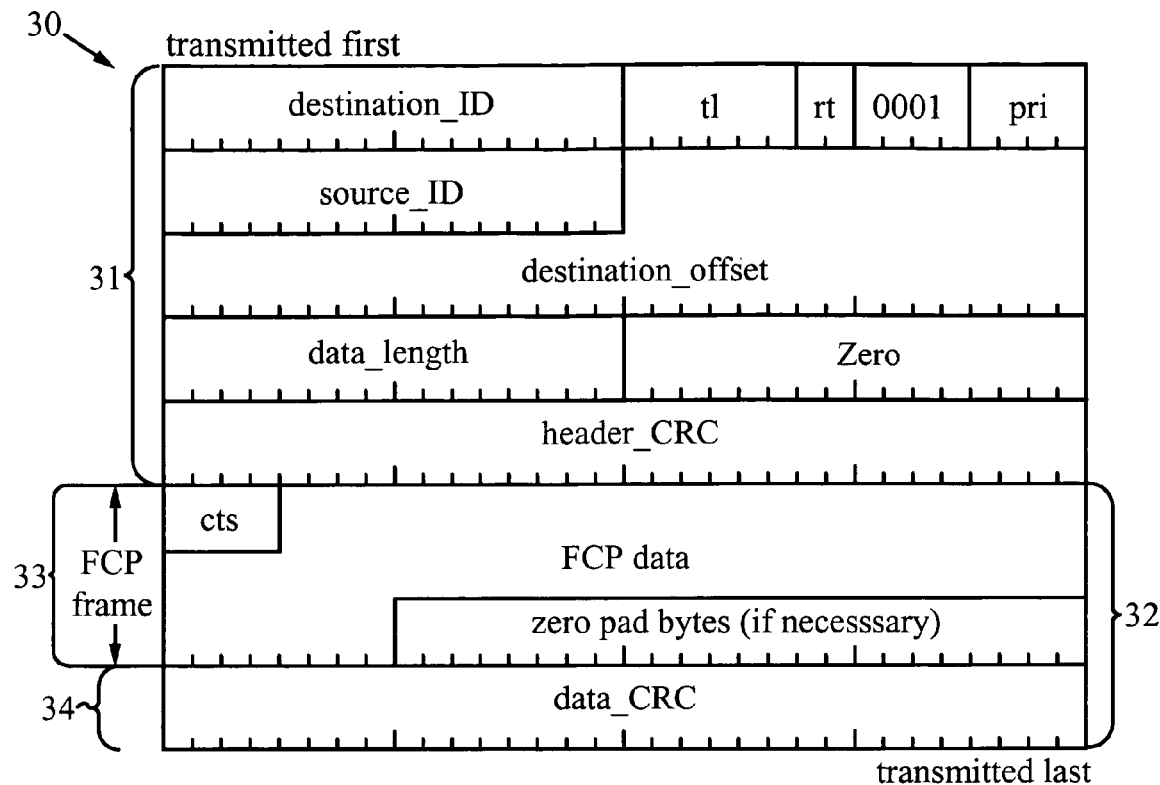
FIG. 4 shows a standard AV/C command and response data packet in accordance with the AV/C Digital Interface Command Set for asynchronous data packet transmission over an IEEE 1394-1995 serial bus network.

A format of a block write packet 30 according to the IEEE Std 1394-1995 is illustrated in FIG. 4. The asynchronous block write packet includes a header 31 and a data payload 32. The header 31 includes the fields destination_ID, tl, rt, tcode, pri, source_ID, destination_offset, data_length, extended_tcode and header_crc. The destination_ID field is a sixteen bit field which specifies the node ID of the receiving node to which the packet is addressed. The transaction label field tl is a six bit field that specifies a unique tag for each outstanding transaction from a node. The retry code field rt is a two bit field which specifies whether the packet is a retry attempt and the retry protocol to be followed by the destination node. The transaction code field tcode is a four bit field that specifies the packet format and the type of transaction that is to be performed. For a write request for data block operation the transaction code field value is equal to 0001. Within the possible values for the transaction code field, there are currently five values that are reserved.

The priority field pri is a four bit field that is used by the back plane. The source-ID field is a sixteen bit field that specifies the node ID of the transmitting node of the packet. The destination offset field is a forty-eight bit field that specifies the forty-eight bits of the destination node address of request packet. The data length field is a sixteen bit field that specifies the length of the data field of data block payload packets. The extended transaction code field extended_tcode is a sixteen bit field that conventionally is only meaningful if the transaction code field indicates a lock request or lock response packet. The header_CRC field is a thirty-two bit field that is used to perform a cyclical redundancy check (CRC) on the data within the header.

The data portion of the packet includes a data block payload field and a data_crc field. The data_crc field is a thirty-two bit field that is used to perform a cyclical redundancy check (CRC) on the data within the data portion of the packet.

AV/C command and response data packets are transmitted between networked devices in data streams that are made up of one or more discrete data packets having the format illustrated in FIG. 4 and described above. The data packets are transmitted over the serial bus and received by a device with the appropriate destination address. Using a read transaction, data at a particular address within a responding node is transferred back to a requesting node. Using a write transaction, data is transferred from a requesting node to a particular address within one or more responding nodes. Using lock transactions, data is transferred from a requesting node to a responding node, processed with data at a particular address within the responding node and the result is then transferred back to the requesting node.

Again referring to FIG. 4, the data payload frame 33 is organized into data sequence of data fields according to the Function Control Protocol (FCP) defined by the standard IEC 61883, Digital interface for Consumer Audio/Video. The Function Control Protocol frame provides a simple format to encapsulate device command and response data sets within the IEEE Standard 1394-1995 serial bus for asynchronous block read and write data transactions. The payload of the FCP frame 33 is limited to a maximum of 512 bytes.

Figure 5A:
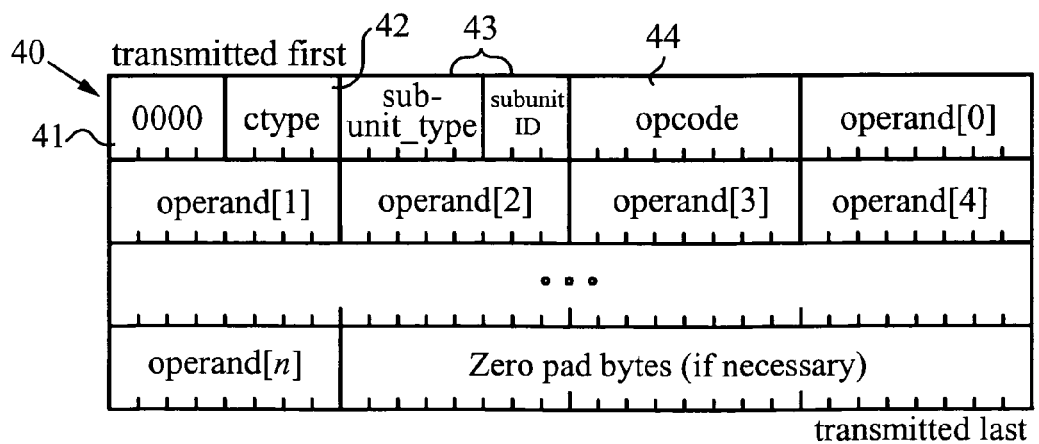
FIGS. 5 *a–b* show response and command data frames formatted according to the standard AV/C protocol.
Figure 5B:
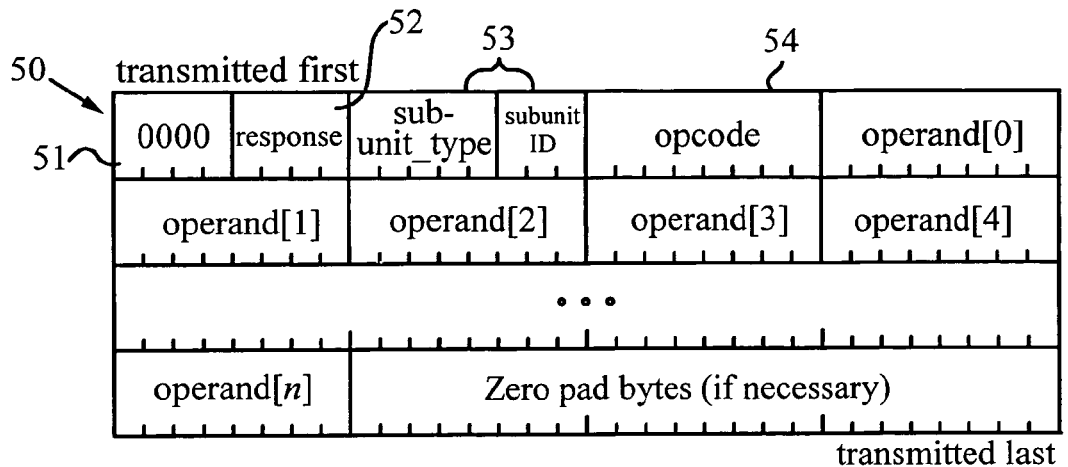

FIGS. 5a–b show a detailed command FCP data frame 40 and a response FCP data frame 50 formatted in accordance with the standard AV/C protocol. The first data fields in both of the data frames 40 and 50 are the cts data fields 41 and 51, respectively. The cts data fields 41 and 51 hold 4 bits of data each and define the transaction format that is to be used in the FCP frames 40 and 50; the code for the standard AV/C format shown in FIGS. 5a–b is 0000. The ctype data field 42 and the response data field 52 are also 4 bits in length and encode the data packets 40 and 50 for the type of command or response data transaction. For example, a command frame such as the one shown in FIG. 5a, may be encoded for a control command, an inquiry command or any other data transaction that is required. The subunit type and the subunit ID data fields 43 and 53 encode the data packets 40 and 50 for the resource subunit within the device that is being used to execute the command data set. For example, the command packet may be issued to start a display of the video monitor, to turn on/off a tuner, turn on/off a recorder and the like. Since several subunit resources may belong to the same device or belong to the same device node address, the subunit type and ID is used to distinguish them. The opcode data fields 44 and 54 code the data packets 40 and 50 for the device operation to be executed and the operand data fields define the parameters of the operation to be executed.

Figure 6:
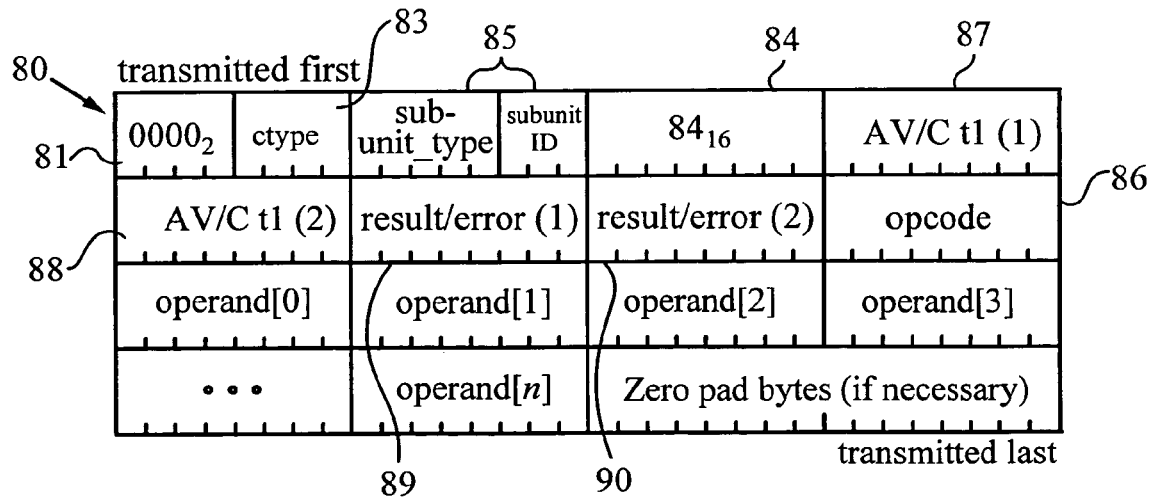
FIG. 6 shows a command data frame encoded with extension data according to the modified AV/C format of the preferred embodiment of the current invention.

FIG. 6 illustrates a data packet 80 according to the preferred embodiment of the present invention. The cts data field 81 indicates that the format of the data to be used in the data packet 80, shall be AV/C, and thus indicates the presence of the data field 84 which takes the place of the opcode field. The data field 84 provides encoding for the data packet to include a number of extension data fields. The data field 84 is preferably one byte in length and positioned after the subunit_type and subunit_ID data fields 85 in the same location as the opcode field 44 in the command FCP data frame 40 of FIG. 5a. The data field 84, in this example, indicates the number of extension data fields 87, 88, 89 and 90. In the preferred embodiment of the invention the data values in the data field 84 indicate the number of extension fields, wherein each extension field preferably includes one byte of extended data. In this preferred embodiment, the data field 84 encodes the data packet 80 for the number of extension data fields according to the following method: when the first hexadecimal index data value is eight, the second hexadecimal index data value encodes for the number of extension data bytes; and when the first hexadecimal index data value is nine, the number of extension data bytes is equal to fifteen plus the second hexadecimal index data value. For example, when the data field 84 has a hexadecimal data value of $84_{16}$, the number of extension data fields is equal to four, such as the extension bytes 87, 88, 89 and 90 shown in FIG. 6. If the data field 84 has a hexadecimal data value of $94_{16}$ (not shown), the number of extension data bytes is equal to fifteen plus four or nineteen extension data bytes. In this way, the data packet 80 can be encoded to have any number of extension data fields from one to thirty-one by providing the appropriate data in the data field 84. The extended data fields are then used to hold extension data to support common command data for devices operating therein.

Again referring to FIG. 6, the extension data fields 87–90 are used to hold extension data to support any number of added features but are particularly useful for holding transaction data, wherein the transaction data within the fields 87–90 encode the data packet for transaction histories of previously transmitted and or received data packets. In an embodiment of the invention, one or two of the extension data fields 87 and 88 are used to provide a data packet number. Each data packet is assigned a transaction label number with a unique value that is used by networked devices to discern when duplicate requests have been made and to provide a numerical transaction history for each data packet. The transaction data values are recycled when the maximum number of assigned values is reached which will depend on the size of the transaction data field. If the data packet 80 is encoded to have one byte of transaction data, the data field will support 256 data values. If the data packet 80 is encoded to hold two bytes of transaction data, up to 65535 data values are possible. While the data packet shown in FIG. 6 is encoded to contain two bytes for the AV/C transaction label that are each one byte in length, it will be clear to one skilled in the art that the data packet can be encoded to contain a single data field that is one byte in length or less.

Figures 7, 8:
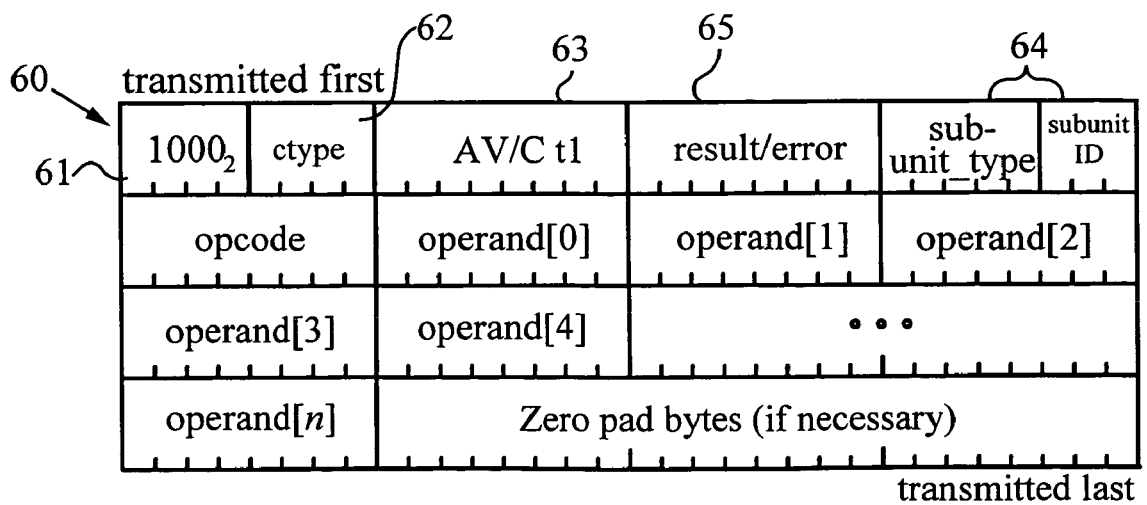
FIG. 7 shows a table of field values used to indicate status or error values within a result/error field according to the current invention.
FIG. 8 shows an alternate embodiment of a command data frame encoded with extended transaction data fields via the modification of the cts data field according to the modified AV/C protocol of the current invention.

Also, a result/error field can be encoded within the extension data fields 89 and 90 in this header. Within the command frame 80, illustrated in FIG. 6, the extension data fields 89 and 90 include result/error information. The result/error information returns specific values that indicate the result of a command, such as status or error of the command after its execution on the target device. FIG. 7 illustrates a table of field values preferably used to indicate various status or error values within the result/error field.

FIG. 8 illustrates an alternative embodiment of a modified AV/C command frame 60 that is formatted in accordance with the present invention. The cts data field 61 is encoded to indicate the data sequence within the data packet 60 with the extension data fields 63 and 65 and specifies that this data packet is an extended transaction code data packet. In the AV/C command frame 60 of FIG. 8, the cts data field 61 includes a binary value equal to 1000. The extension data fields 63 and 65 are reserved to hold extension data for supporting new or added common features of the device or system. In the command data frame shown in FIG. 8, the cts data field 61 encodes the data frame 60 for two bytes of extension data preferably positioned in the data sequence after the ctype data field 62 and before the subunit type and ID data fields 64.

Figure 9:
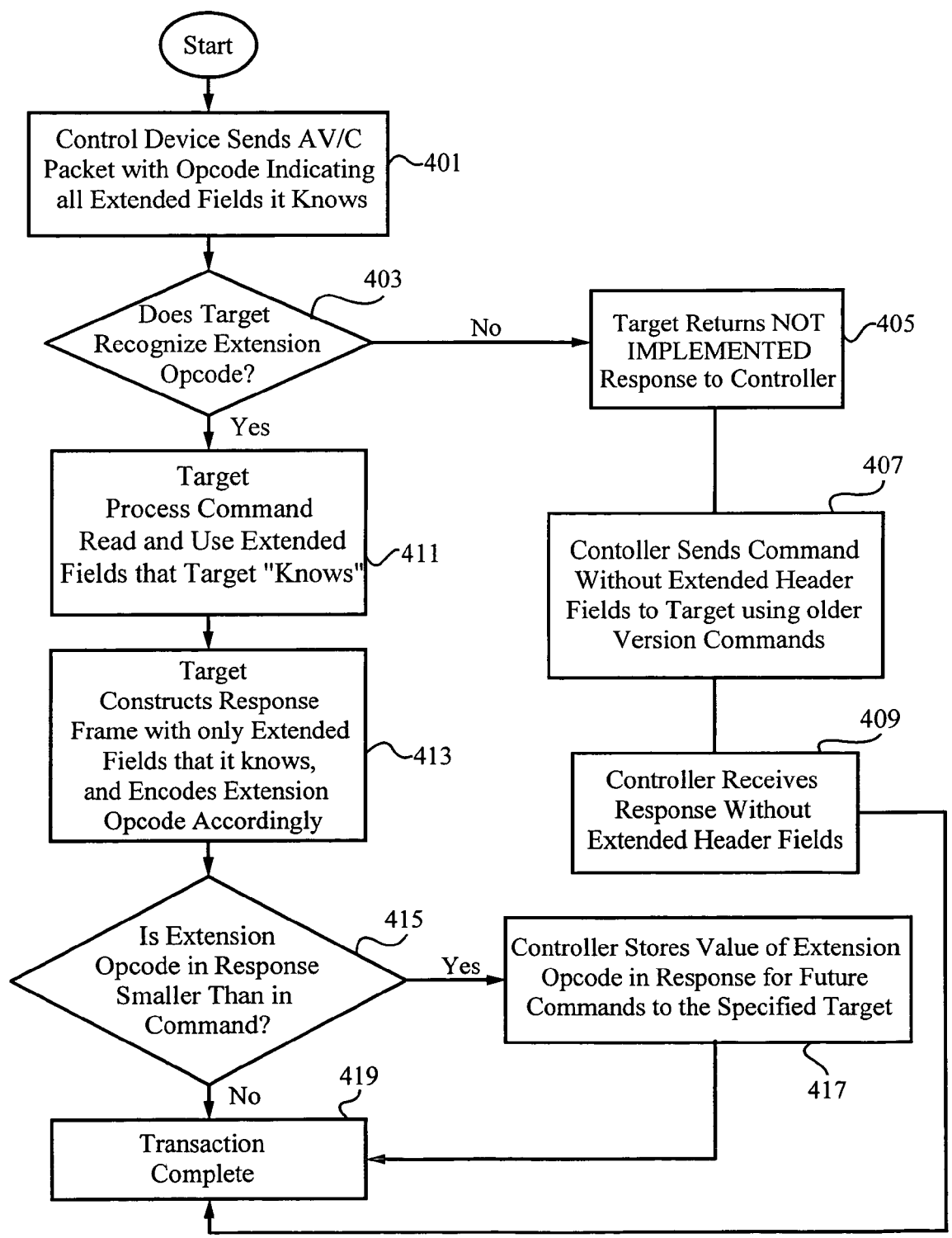
FIG. 9 illustrates a flow chart for transacting AVC command and response data packets with extension data fields between devices coupled within an IEEE 1394-1995 serial bus according to the preferred embodiment of the invention.

FIG. 9 shows a flow chart illustrating a method for transmitting command and response data packets according to the preferred embodiment of the current invention. Preferably, each device within the network is capable of processing AV/C data packets encoded with extended data fields and of utilizing extension data that it recognizes. Further, it is preferable that control devices within the system are capable of ignoring or removing unsupported extension data from extended data fields. Accordingly, in the step 401, a control device sends an AV/C command data packet containing extended data fields required to support all of its features to a target device. In the step 403, it is determined if the target device recognizes the extension opcode. If it is determined at the step 403 that the target device does not recognize the extension opcode within the AV/C packet, then the target device returns a not implemented response packet, at the step 405. Then, at the step 407, the control device sends a command packet without the extended header fields to the target device utilizing a previous version of the command packet. At the step 409, the control device receives a response packet from the target device without the extended header fields. The transaction is then complete at the step 419. If, at the step 403, it is determined that the target device recognizes the extension opcode in the AV/C packet, then in the step 411, the target device processes the data packet using only extended data bytes that it supports or recognizes and ignores extension data and extended data fields that it does not recognize or that it does not support. In the step 413, the target device returns a response data packet to the control device with extension data and extended data fields that the target device supports, along with the corrected encoded extension opcode.

The control device then determines, at the step 415, whether the extension opcode received in the response packet from the target device is smaller than the extension opcode in the original AV/C command packet. If it is determined at the step 415, that the extension opcode in the response packet is smaller than the extension opcode in the original AV/C command packet, then at the step 417, the control device stores the value of the extension opcode received in the response packet to use with future commands sent to the target device. The transaction is then complete at the step 419. Otherwise, if it is determined at the step 415, that the extension opcode in the response packet is not smaller than the extension opcode in the original AV/C command packet, then the transaction is complete at the step 419.

The AV/C command and response data packets utilized in the current invention maintain the basic data construction of the standard AV/C command and response control data frame. However, it may occur that there are several devices operating within an IEEE 1394-1995 serial bus environment that are not compatible with the modified AV/C command and response data packets or portions thereof. Thus, the present invention provides a method of establishing compatibility between devices that support the new features and older devices that do not. The preferred steps for establishing compatibility between devices within an IEEE 1394-1995 serial bus environment utilizing the modified AV/C command and response data packets are outlined in the steps of FIG. 9.

Figure 10:
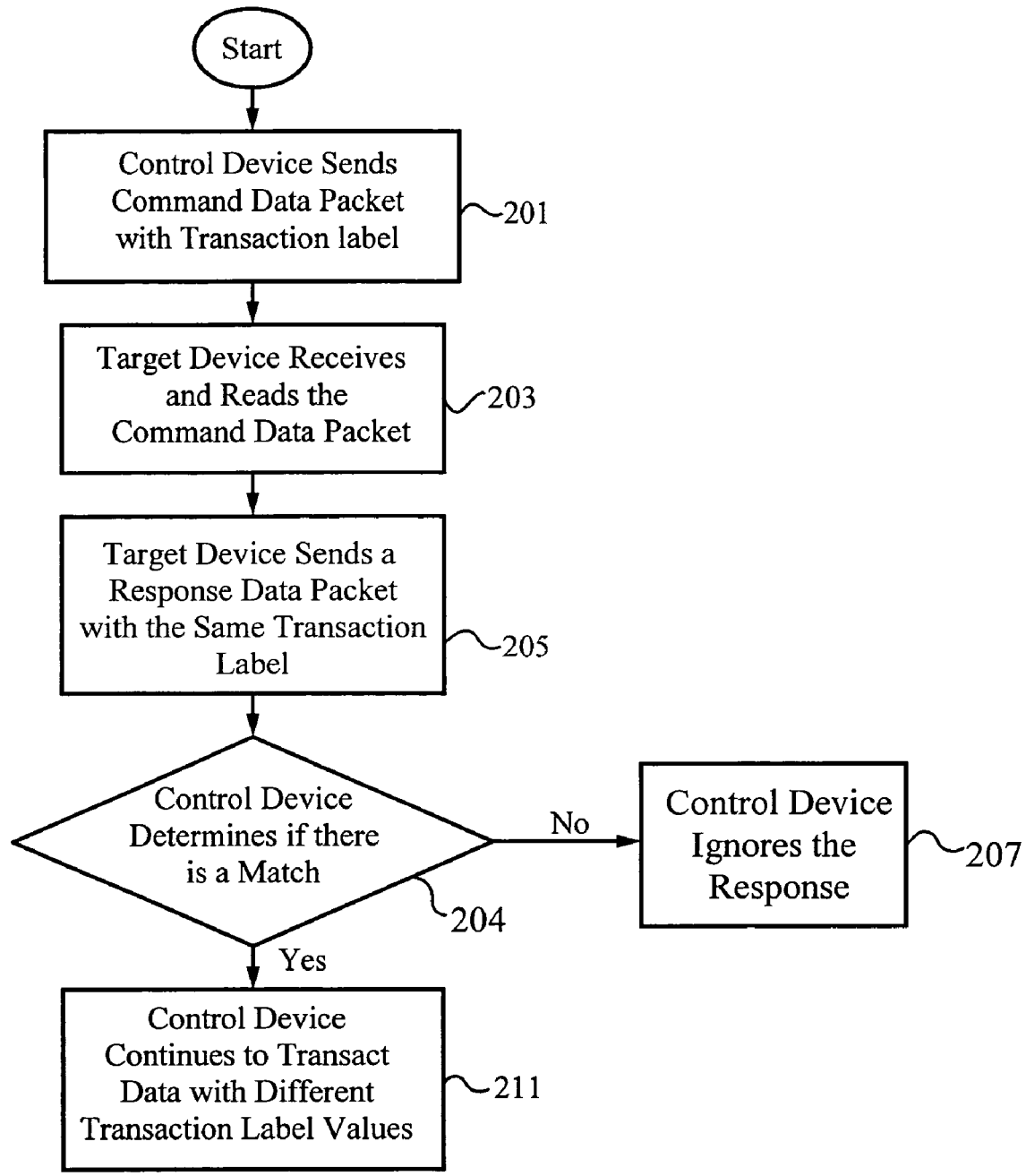
FIG. 10 illustrates a flow chart for using transaction data values to keep track of multiple AV/C command and response transactions between a control device and a target device.

FIG. 10 is a flow chart illustrating a method for using transaction data to match device command data packets with corresponding response data packets using AV/C transaction data according to the present invention. In the step 201, a control device sends a command data packet with a transaction data field and transaction data. In the step 203, the target device receives and reads the command data packet and in the step 205, the target device sends a corresponding response data packet to the control device with a transaction data field and transaction data which matches the transaction data contained within the command data packet sent in the step 201. In the event that the several data transactions are taking place between networked devices, the control device can keep track of which response and command data packets belong together, regardless of the order in which the command and response data packets are sent or received. In one embodiment of the invention the transaction data values are provided for command and response data packets sequentially. The transaction labels are recycled such that when the maximum number of unique transaction labels that are supported by the data field have been assigned, the transaction data values are reused.

Again referring to FIG. 10, after the target device receives and reads the command data packet in the step 203 and sends the response data packet in the step 205, then in the step 209, the control device determines if there is a match between the command data packet issued in the step 201 and the response data packet sent in the step 205. If in the step 209, the control device determines that there is a match, then in the step 211 data transmission between the target device and the control device continues as required by the system, with different transaction label values for each new transaction. If, however, in the step 209 the control device determines that there is not a match between an issued command data packet and the response data packet issued in the step 205, then in the step 207, the control device will ignore the response data packet.

Figure 11:
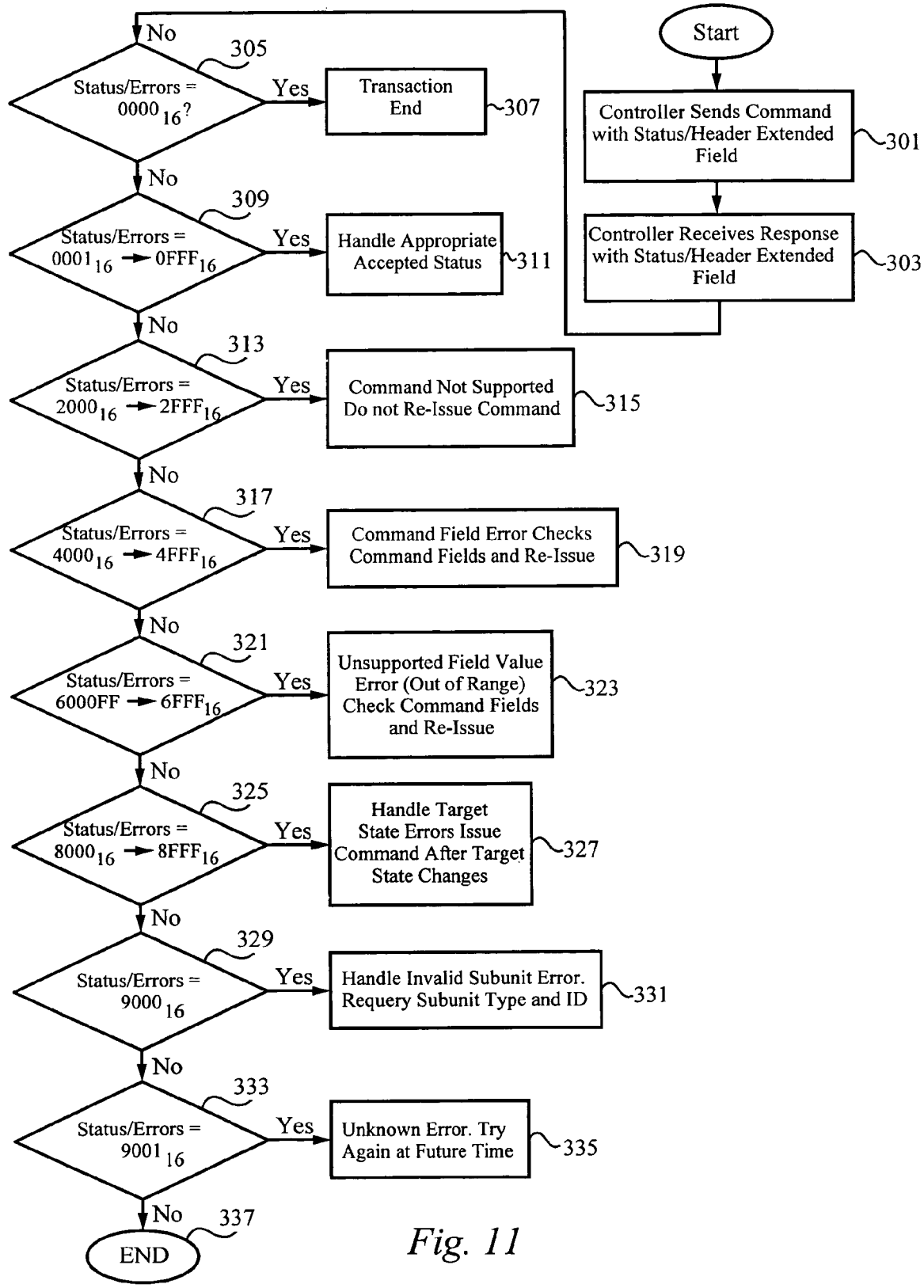
FIG. 11 illustrates a flow chart for communicating error messages between a control device and a target device coupled within an IEEE 1394-1995 serial bus.

FIG. 11 illustrates a flow chart outlining a method for using error data and labels within response data packets according to the present invention. In the step 301, a control device sends a command data packet with extended data fields according to the present invention to a target device. In the step 303, the control device receives a response data packet from the target device in response to the command data packet sent in the step 301. In the step 305, the control device determines if the result/error field of the response packet has a hexadecimal value equal to 0000. If the control device determines that the result/error field does have a value equal to 0000, then at the step 307, the control device recognizes that there is no status/error value in the response packet and the target device executed the original command packet without error. If, at the step 305, the control device determines that the result/error field does not have a value equal to 0000, then, at the step 309, the control device determines if the result/error field of the response packet has a hexadecimal value in the range from 0001 to 0 FFF. If the control device determines that the result/error field does have a value in the range of 0001 to 0 FFF, then at the step 311, the control device handles the appropriate accepted status of the result/error field.

If, at the step 309, the control device determines that the result/error field does not have a value in the range of 0001 to 000 F, then, at the step 313, the control device determines if the result/error field of the response packet has a hexadecimal value in the range of 2000 to 2 FFF. If the control device determines that the result/error field does have a value in the range of 2000 to 2 FFF, then at the step 315, the control device recognizes that the command is not supported by the target device and should not be reissued.

If, at the step 313, the control device determines that the result/error field does not have a value in the range of 2000 to 2 FFF, then, at the step 317, the control device determines if the result/error field of the response packet has a hexadecimal value in the range of 4000 to 4 FFF. If the control device determines that the result/error field does have a value in the range of 4000 to 4 FFF, then, at the step 319, the control device recognizes that there is a command field error in the original command data packet. The control device checks the command fields in the original command data packet and reissues the original command data packet.

If, at the step 317, the control device determines that the result/error field does not have a value in the range of 4000 to 4 FFF, then, at the step 321, the control device determines if the result/error field of the response packet has a hexadecimal value in the range of 6000 to 6 FFF. If the control device determines that the result/error field does have a value in the range of 6000 to 6 FFF, then, at the step 323, the control device recognizes that there is an unsupported field value or out of range error in the original data command packet. The control device checks the command fields in the original command data packet and reissues the original command data packet.

If, at the step 321, the control device determines that the result/error field does not have a value in the range of 6000 to 6 FFF, then, at the step 325, the control device determines if the result/error field of the response packet has a hexadecimal value in the range of 8000 to 8 FFF. If the control device determines that the result/error field does have a value in the range of 8000 to 8 FFF, then, at the step 327, the control device recognizes the there is an error related to the state of the target device. The control device issues the command after the state of the target device changes.

If, at the step 325, the control device determines that the result/error field does not have a value in the range of 8000 to 8 FFF, then, at the step 329, the control device determines if the result/error field of the response packet has a hexadecimal value equal to 9000. If the control device determines that the result/error field does have a value equal to 9000, then, at the step 331, the control device recognizes that there is an invalid subunit error. The control device requeries the subunit type and ID and reissues the command packet, as appropriate.

If, at the step 329, the control device determines that the result/error field does not have a value equal to 9000, then, at the step 333, the control device determines if the result/error field of the response packet has a hexadecimal value equal to 9001. If the control device determines that the result/error field does have a value equal to 9001, then, at the step 335, the control device recognizes that there is an unknown error. The control device then reissues the command packet at a later time. If, at the step 333, the control device determines that the result/error field does not have a value equal to 9001, then, the process ends at the step 337.

The present invention has been described in terms of specific embodiments incorporating details to facilitate the understanding of the principles of construction and operation of the invention. Such references, herein, to specific embodiments and details thereof are not intended to limit the scope of the claims appended hereto. It will be apparent to those skilled in the art that modifications can be made in the embodiment chosen for illustration without departing from the spirit and scope of the invention. Specifically, it will be apparent to one of ordinary skill in the art that an IEEE 1394-1995 serial bus network can establish communication protocols in any number of way with the modified AV/C command and response packet format. Further the position of the extended fields within the FCP data frame is preferably positioned early in the data packet sequence, but can be placed anywhere within the data packet. It will also be apparent to those skilled in the art that while the preferred embodiment of the present invention is used with an IEEE 1394-1995 serial bus structure, the present invention could also be implemented on any other appropriate digital interfaces or bus structures, including other or later versions of the IEEE 1394 serial bus.

What is claimed is:

1. A method of encoding a data packet with one or more extension fields, wherein the data packet substantially conforms to a standardized AV/C command or response data packet for transmitting the data packet over a network, the method comprising:
    a) providing a data packet with a control data frame having a fixed payload, wherein the control data frame comprises a sequence of data fields; and
    b) providing extended fields data within at least one of the data fields, wherein the extended fields data encodes the data packet for the extension data field and includes a value representing a quantity of extension data included within the data packet, further wherein the value within the extended fields data comprises one byte of data including a first hexadecimal data value and a second hexadecimal data value and encodes the data packet to hold a number of extension data bytes, wherein the number of extension data bytes is determined such that when the first hexadecimal data value of the extended fields data is equal to eight, the second hexadecimal data value of the extended fields data equals the number of extension data bytes; and when the first hexadecimal data value is equal to nine, the number of extension data bytes is fifteen plus the second hexadecimal data value.

2. The method of claim 1, wherein the extended fields data further encodes the data packet for a transaction data field capable of holding one byte of transaction data.

3. A system for transmission of asynchronous AV/C command and response data over a standard IEEE 1394 serial bus, the system comprising:
    a) a control device in communication with the standard IEEE 1394 serial bus, the control device configured for generating a command data stream comprising at least one command data packet with a control data frame comprising control data fields and extension data for supporting the control device features; and
    b) a target device in communication with the standard IEEE 1394 serial bus, the target device configured for receiving the command data stream and generating a corresponding response data stream comprising at least one response data packet with a control data frame comprising target data fields wherein at least one of the target data fields is a response transaction label data field containing transaction label data that codes the response data stream for the compatibility of the target device with the command data stream received.

4. The system of claim 3, wherein the transaction label data that codes the response data stream for error status and error labels.

5. The system of claim 3, wherein at least one of the control data fields is a command transaction data field containing command transaction data, and further wherein the response transaction data and the control transaction data match the command data stream with the corresponding response data stream.

6. The system of claim 3, wherein the target device is a video recorder subunit.

7. The system of claim 3, wherein the control device comprises a video screen and an input device.

8. The system of claim 3, further comprising a memory unit for storing transaction data values data.

9. A system for transmission of asynchronous AV/C command and response data over a standard IEEE 1394 serial bus, the system comprising:
  a) a control device with features in communication with the standard IEEE 1394 serial bus, the control device configured for generating a command data stream comprising at least one command data packet with a control data frame comprising control data fields, wherein at least one of the control data fields comprises extended fields and extension data for supporting the control device features; and
  b) a target device in communication with the standard IEEE 1394 serial bus, the target device configured for receiving the command data stream and generating a response data stream comprising at least one response data packet with a control data frame comprising a target data field, wherein the target data field comprises features data providing a signature of features implemented at the target device, further wherein the control device is capable of adding or removing the extended fields data field for subsequently transmitted command data packets in the event that the target device does not support features encoded for therein.

10. The system of claim 9, wherein the response data packet provides a signature for features supported by both the control device and the target device.

11. The system of claim 9, wherein the target device is a video recorder subunit.

12. The system of claim 9, wherein the control device comprises a video screen and an input device.

13. A method of establishing a communication protocol for the transmission of AV/C command and response data packets over an IEEE 1394 serial bus, the method comprising:
  a) submitting an AV/C command data packet from a control device over the serial bus to a target device, wherein the command data packet is formatted with extended fields data and extension fields for supporting features of the control device;
  b) detecting the extended fields data at the target device and generating a response data packet therefrom, wherein the response data packet provides a compatibility signature for control device features that are compatible with the target device; and
  c) transmitting the response data packet to the control device, wherein the control device reads the response data packet and formats subsequently transmitted command data packets transmitted to the target device to comprise extended fields data and extension data fields that support compatible features, further wherein when the response data packet contains an error message, extended fields data and extension data fields are removed from the subsequently transmitted command data packets.

14. A method of establishing a communication protocol for the transmission of AV/C command and response data packets over an IEEE 1394 serial bus, the method comprising:
  a) submitting an AV/C command data packet from a control device over the serial bus to a target device, wherein the command data packet is formatted with extended fields data and extension fields for supporting features of the control device;
  b) detecting the extended fields data at the target device and generating a response data packet therefrom, wherein the response data packet provides a compatibility signature for control device features that are compatible with the target device; and
  c) transmitting the response data packet to the control device, wherein the control device reads the response data packet and formats subsequently transmitted command data packets transmitted to the target device to comprise extended fields data and extension data fields that support compatible features, further wherein an established communication protocol is stored by the target device to provide a history of the compatible device features.

* * * * *